US011157866B2

(12) United States Patent
Bostick et al.

(10) Patent No.: US 11,157,866 B2
(45) Date of Patent: Oct. 26, 2021

(54) INTELLIGENT PACKAGE DELIVERY

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, West Bengal (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 579 days.

(21) Appl. No.: 15/335,480

(22) Filed: Oct. 27, 2016

(65) Prior Publication Data

US 2018/0121878 A1  May 3, 2018

(51) Int. Cl.
*G06Q 10/08* (2012.01)
(52) U.S. Cl.
CPC ................ *G06Q 10/08355* (2013.01)
(58) Field of Classification Search
CPC ............. G06Q 10/087; G06Q 10/0836; G06Q 10/0833; G06Q 10/0835; G06Q 10/08355; G06Q 10/083; G06Q 10/08
See application file for complete search history.

(56) References Cited

U.S. PATENT DOCUMENTS

| | | | |
|---|---|---|---|
| 6,974,928 B2 | 12/2005 | Bloom | |
| 9,552,564 B1* | 1/2017 | Martenis | G06Q 10/083 |
| 9,786,187 B1* | 10/2017 | Bar-Zeev | G06Q 10/08355 |
| 9,959,771 B1* | 5/2018 | Carlson | G08G 5/0039 |
| 10,152,685 B1* | 12/2018 | Ananthanarayanan | G06Q 10/083 |
| 2006/0136237 A1* | 6/2006 | Spiegel | G06Q 10/083 705/330 |
| 2006/0235739 A1* | 10/2006 | Levis | G06Q 10/08 705/1.1 |

(Continued)

OTHER PUBLICATIONS

Cakir, F. (2016). Data-centric solution methodologies for vehicle routing problems (10181918). Available from ProQuest Dissertations and Theses Professional. (1834310286). Retrieved from https://dialog.proquest.com/professional/docview/1834310286?accountid=131444 (Year: 2016).*

(Continued)

*Primary Examiner* — Michael P Harrington
(74) *Attorney, Agent, or Firm* — Aaron Pontikos; George S. Blasiak; Heslin Rothenberg Farley & Mesiti PC

(57) ABSTRACT

Methods, computer program products, and systems are presented. The methods computer program products, and systems can include, for instance: obtaining order information for a plurality of package delivery orders, wherein the order information includes one or more package pickup stop and one or more package drop off stop; and determining one or more optimized package delivery route for one or more vehicle using the order information, wherein an optimized package delivery route of the one or more optimized package delivery route includes a first stop associated to a first order of the plurality of package delivery orders and a second stop associated to a second order of the plurality of package delivery orders.

20 Claims, 6 Drawing Sheets

(56) References Cited

U.S. PATENT DOCUMENTS

| | | | |
|---|---|---|---|
| 2010/0094769 A1* | 4/2010 | Davidson | G06Q 10/06 705/338 |
| 2011/0161203 A1 | 6/2011 | Florence et al. | |
| 2014/0025295 A1* | 1/2014 | Paul | G06Q 10/047 701/527 |
| 2014/0330739 A1 | 11/2014 | Falcone et al. | |
| 2014/0358703 A1 | 12/2014 | Stuntebeck et al. | |
| 2015/0120600 A1* | 4/2015 | Luwang | G06Q 10/08355 705/338 |
| 2015/0292894 A1* | 10/2015 | Goddard | G01C 21/3453 701/400 |
| 2016/0048804 A1* | 2/2016 | Paul | G06Q 10/08355 705/338 |
| 2016/0063436 A1 | 3/2016 | Coles et al. | |
| 2016/0071056 A1* | 3/2016 | Ellison | G06Q 10/08355 705/338 |
| 2016/0140486 A1* | 5/2016 | Tibbs | G06Q 10/083 705/330 |
| 2016/0258775 A1* | 9/2016 | Santilli | G01C 21/3614 |
| 2016/0335568 A1* | 11/2016 | Bailey | G06Q 10/047 |
| 2017/0344943 A1* | 11/2017 | Herrin | G06Q 30/0217 |
| 2017/0352103 A1* | 12/2017 | Choi | H04W 4/029 |
| 2018/0025649 A1* | 1/2018 | Contreras | G05D 1/0033 701/3 |

OTHER PUBLICATIONS

Vonolfen, S., & Affenzeller, M. (2016). Distribution of waiting time for dynamic pickup and delivery problems. Annals of Operations Research, 236(2), 359-382. doi:http://dx.doi.org/10.1007/S10479-014-1683-6 (Year: 2016).*

Mell et al., "The NIST Definition of Cloud Computing", National Institute of Standards and Technology, U.S. Department of Commerce, NIST Special Publication 800-145, Sep. 2011, 7 pages.

ip.com Prior Art Database Technical Disclosure, Authors et. al.: Siemens, Juergen Carstens, Original Publication Date: Sep. 25, 2007, ip.com No. IPCOM000158024D, ip.com Electronic Publication Date: Sep. 12, 2007 Copyright: Siemens AG 2007, 6 pages.

* cited by examiner

US 11,157,866 B2

INTELLIGENT PACKAGE DELIVERY

TECHNICAL FIELD

The present disclosure relates to automating package delivery planning, and more particularly to methods, computer program products, and systems for determining one or more optimized package delivery routes.

BACKGROUND

Conventional package delivery planning services are often characterized by pre-scheduled package delivery routes. For example, a same package delivery route may be travelled on a daily or weekly basis. However, where there is an increased package delivery load, package delivery entities may not be sufficiently resourced. Where there is a decreased package delivery load a package delivery vehicle may travel to locations that are unnecessary. Conventional package delivery planning services are often characterized by planning services being carried out for a single package order independently of any other package order.

SUMMARY

The shortcomings of the prior art are overcome, and additional advantages are provided, through the provision, in one aspect, of a method. The method for automated package delivery planning includes, for example: obtaining order information for a plurality of package delivery orders, wherein the order information includes one or more package pickup stop and one or more package drop off stop; and determining one or more optimized package delivery route for one more vehicle using the order information, wherein an optimized package delivery route of the one or more optimized package delivery route includes a first stop associated to a first order of the plurality of package delivery orders and a second stop associated to a second order of the plurality of package delivery orders.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
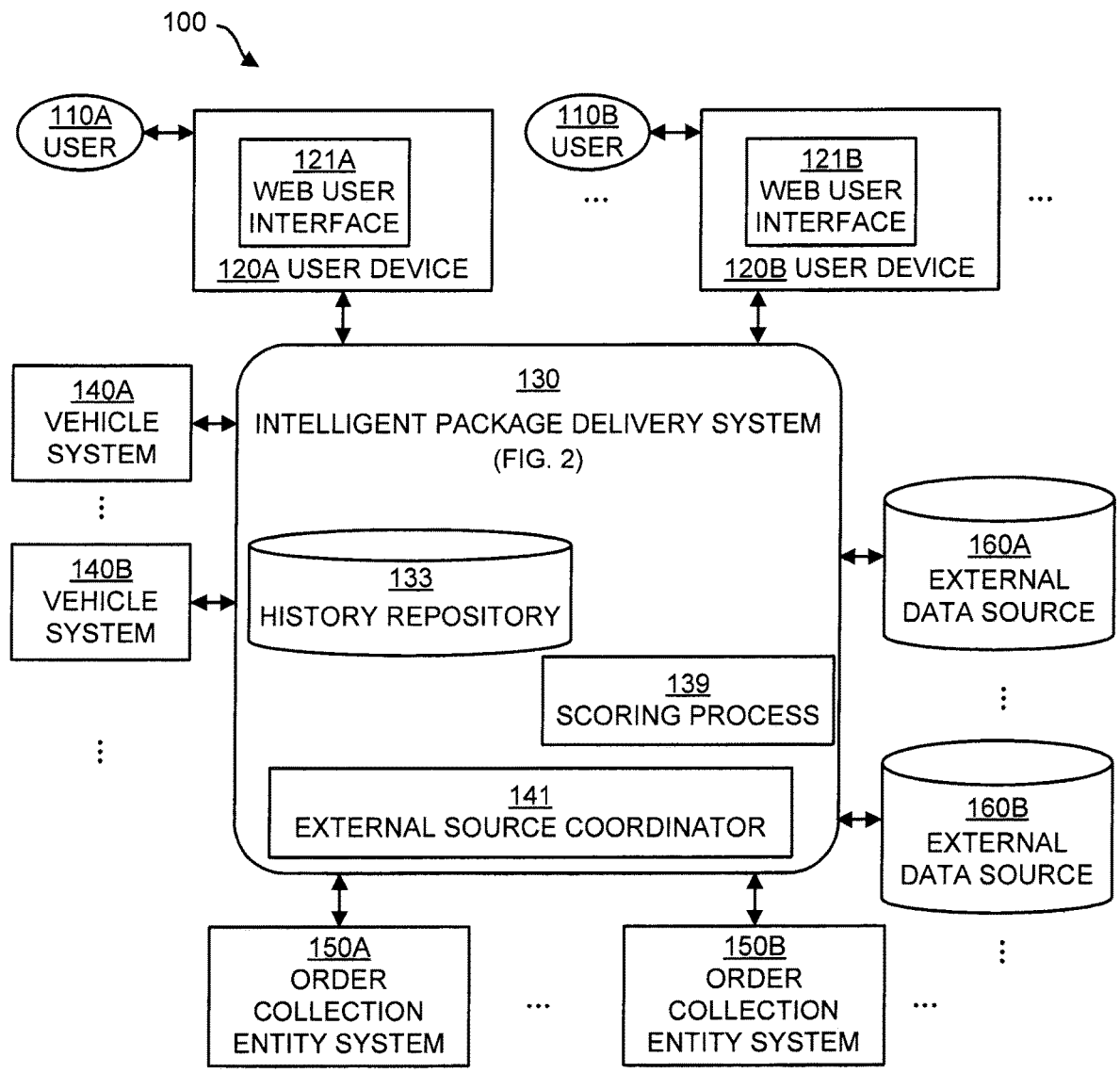
FIG. 1 depicts an intelligent package delivery system in a computer network environment according to an embodiment.

FIG. 1 depicts an intelligent package delivery system 130 in a network environment 100 according to an embodiment set forth herein.

The network environment 100 can include one or more user 110A-110B, one or more user device 120A-120B, the intelligent package delivery system 130, one or more vehicle system 140A-140B, one or more order collection entity system 150A-150B, and one or more external data source 160A-160B.

Each of the one or more user device 120A-120B can run a web user interface 121A-121B, a software application program that facilitates access to the intelligent package delivery system 130 for the user 110A-110B, who may be an unregistered guest or a registered user. An example of the user device 120A-120B may be, but not limited to, a smartphone having global positioning system (GPS) capability and access to the Internet at various locations of the user 110A-110B.

One or more vehicle system 140A-140B can include e.g. one or more non-autonomous vehicle and/or one or more autonomous vehicle. One or more vehicle system 140A-140B can include one or more land vehicle and/or one or more airborne vehicle.

One or more order collection entity system 150A-150B can include computing node based systems of organizational entities that collect package delivery orders. Such entities can include retail stores with preexisting package delivery services, retail stores without preexisting package delivery services or package delivery entities not associated to any certain retail store. In one embodiment order information as set forth herein can be obtained from one or more order collection entity systems 150A-150B. In one embodiment order information as set forth herein can be obtained from one or more user device 120A-120B. In one embodiment order information as set forth herein can be obtained from a combination of one or more order collection entity system 150A-150B and one or more user device 120A-120B.

In one embodiment users 110A-110B can be registered users of intelligent package delivery system 130. In one embodiment, on becoming registered users of system 130, registered users permit system 130 to access data from one or more order collection entity systems 150A-150B where the registered users of system 130 may also be registered users. In one embodiment, entities maintaining systems 150A-150B may become registered users of system 130. On becoming registered users of intelligent package delivery system 130 entities maintaining order collection entity systems 150A-150B may establish a data sharing agreement with system 130.

Figure 5:
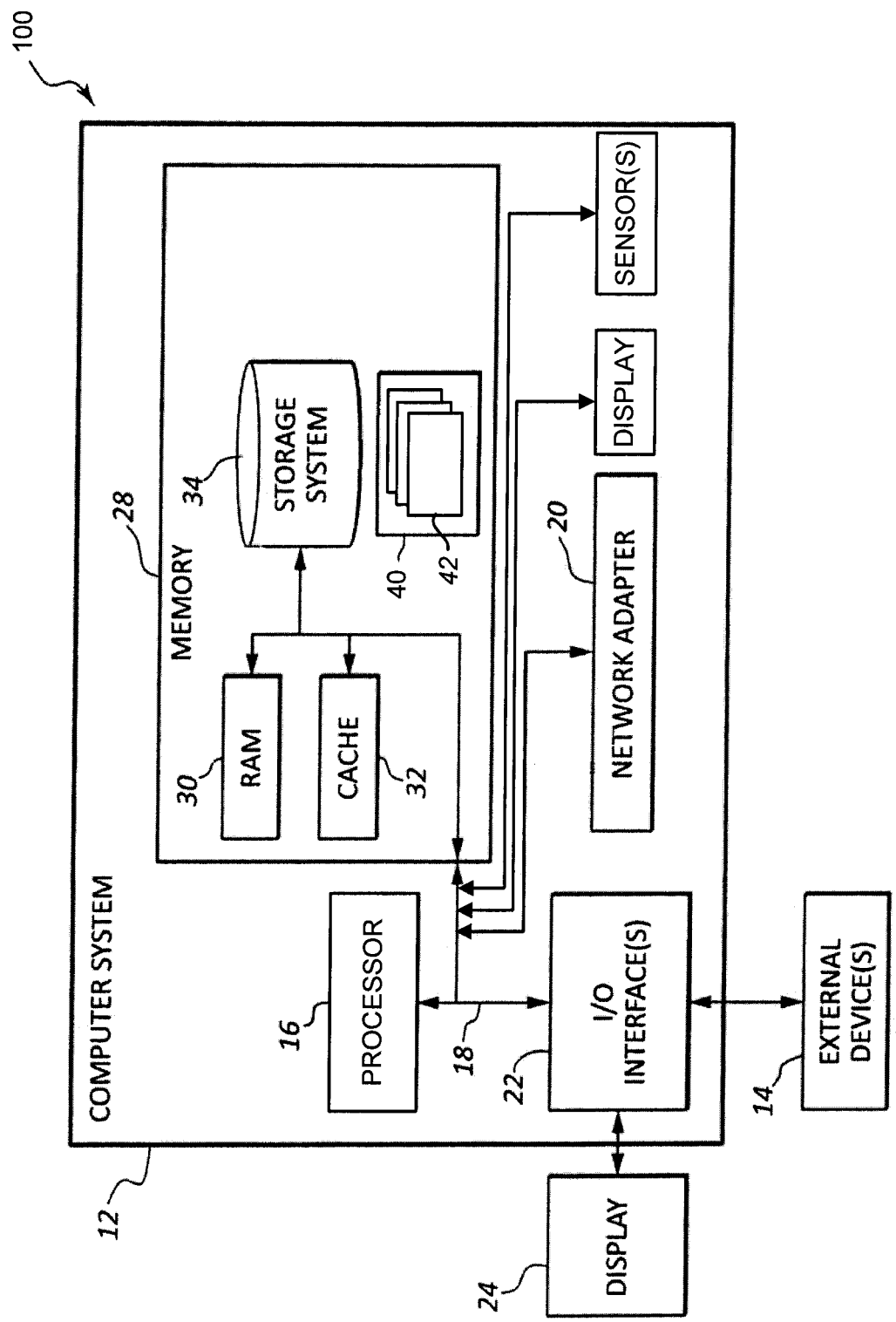
FIG. 5 depicts a cloud computing node according to an embodiment.

In one embodiment, intelligent package delivery system 130, each vehicle system 140A-140B, each order collection entity system 150A-150B and each external data source 160A-160B can include one or more computing node 10 as set forth herein in connection with FIG. 5.

One or more external data source 160A-160B can include e.g. one or more mapping service, which can resolve travel time between two stops. One or more external data source 160-160B can include e.g. one or more weather source, one or more media source, and/or one or more fuel pricing source.

Embodiments of the present invention recognize that, although the number of both package receivers, including the user 110, and package delivery options has grown dramatically and is predicted to grow even more and faster, package delivery planning is often characterized by predetermined package delivery routes being used. Embodiments herein recognize that package receivers have limited access to available package delivery options, have difficulty coordinating numerous package delivery options, and often miss out on the best options because they do not look for certain package delivery options and because they do not know the whole range of available package delivery options to choose from. Embodiments herein recognize that package delivery entities have limited access to available package delivery information, have difficulty coordinating numerous package delivery options, and often miss out on the best options because they do not look for certain package delivery options and because they do not know the whole range of available package delivery options to choose from.

The intelligent package delivery system 130 can includes a history repository (HR) 133, a scoring process 139, and an external source coordinator 141. The intelligent package delivery system 130 may further include a e.g. billing system, a security process, a marketing and e-commerce process, a package delivery manager for following up a trip and for sending reminders to the user 110, for altering real time information to the user 110 during or subsequent to a package delivery, and for locating the user 110 and for providing additional package delivery information for current location of the user 110. In one embodiment, the intelligent package delivery system 130 can operate in a cloud computing environment 50 of FIG. 6, and the components 133, 139, and 141 of the intelligent package delivery system 130 may be distributed across participating computing nodes 10, of FIGS. 5 and 6, of the cloud computing environment 50 of FIG. 6.

History repository 133 of the intelligent package delivery system 130 can store data on usage of the intelligent package delivery system 130 by all users, both guests and registered users. History repository 133 can store information on prior orders of users of system 130, e.g. on packages ordered, times of ordering, packages costs, entities providing packages subject to ordering. History repository 133 can store information on prior package deliveries to users of system 130, e.g. times of deliveries, delivery routes, stops of deliveries. History repository 133 can be used to run predictive models on the recorded usage data, including interactions between the users and the intelligent package delivery system 130, such that the intelligent package delivery system 130 may anticipate and refine future interactions with and better serve the users.

The scoring process 139 of the intelligent package delivery system 130 can weigh sources to determine optimized delivery routes for delivery of package between two or more stops. In one embodiment, scoring process 139 can obtain information from and external source 160A-160B provided by e.g. a mapping service. For example, scoring process 139 can obtain from a mapping service a predicted travel time between two or more stops. Scoring process 139 can score candidate routes for traveling between two or more stops and delivery routes can be sorted and measured against one another. A candidate delivery route with the highest score can be selected as the optimized delivery route. Scoring process 139 can score candidate delivery routes using parameters other than travel time. For example, scoring process 139 can obtain data from an external data source 160A-160B provided by a fuel price data repository so that in one embodiment, a delivery route can be optimized by travel time and based on fuel cost. In one embodiment, a package delivery route can be optimized based on total cost which in one embodiment can be a combination of travel time and fuel cost.

The external source coordinator 141 of the intelligent package delivery system 130 maps and transfers information from the one or more external data source 160A-160B in real time. In order to reduce the number of accesses to the external data sources and associated fees, a certain amount of frequently used external data may be cached within the intelligent package delivery system 130. Keeping the cached external data synchronized with originals of the external data sources 160 for the latest information at all times, particularly when time-critical reservation data is rapidly changing in real time, may not be efficient for the operations of the intelligent package delivery system 130, and consequently the external source coordinator 141 can be employed to assure that the external data utilized by the components 133, and 139 of the intelligent package delivery system 130 is the latest and that the external data sources 160 are most efficiently accessed. By use of the external source coordinator 141, the intelligent package delivery system 130 interacts with the external data source 160 in an abstract level without exposing all functional components of the intelligent package delivery system 130 that require external data. In one embodiment of the present invention, the intelligent package delivery system 130 may still function in a restricted manner without the external source coordinator 141 by use of cached external data, which may be later synchronized with the one or more external data source 160A-160B.

Examples of data serviced by the external source coordinator 141 may be weather updates and social media data, which may be utilized by system 130 to determine optimized package delivery routes avoid certain locations for inclement weather, to refrain from certain areas or activities relevant to safety of the user, etc.

The intelligent package delivery system 130 may be coupled to various external membership and loyalty programs with which the users may have signed up, such that the intelligent package delivery system 130 may prioritize reservations for certain users in external membership/loyalty programs to use the offers from the external membership/loyalty programs as well as to synchronize records for the user to earn or to use points for the respective external membership/loyalty programs.

The intelligent package delivery system 130 further can provide follow-up services after determining of one or more optimized package delivery route such as updates of one or more optimized package delivery route, real time notification during package delivery, package delivery logging, etc. Intelligent package delivery system 130 can facilitate the user to make changes e.g. to a package delivery order. The real time notification is to better inform the user about local weather, news, social media feeds, etc., in real time such that the user may package delivery with the least disruption. For example, the intelligent package delivery system 130 may monitor local weather data closely for any outdoor activities scheduled for the user and, if bad weather is forecasted in the outdoor activity destination, and may continually determine one or more optimized package delivery route during performance of a current route to avoid the weather, to switch with an indoor activity scheduled for dates with good weather. The package delivery logging function maps location of the user in relation to the itinerary to better record visited destinations and to make recommendations as to what kind of adjustments may be made during the trip.

In certain embodiments, the intelligent package delivery system 130 can determine predicted package delivery orders of users and can send one or more message with such predicted orders for confirmation. One or more message with a predicted can include an incentive promotional offer for acceptance by a user to increase a likelihood that a predicted order will be confirmed.

Figure 2:
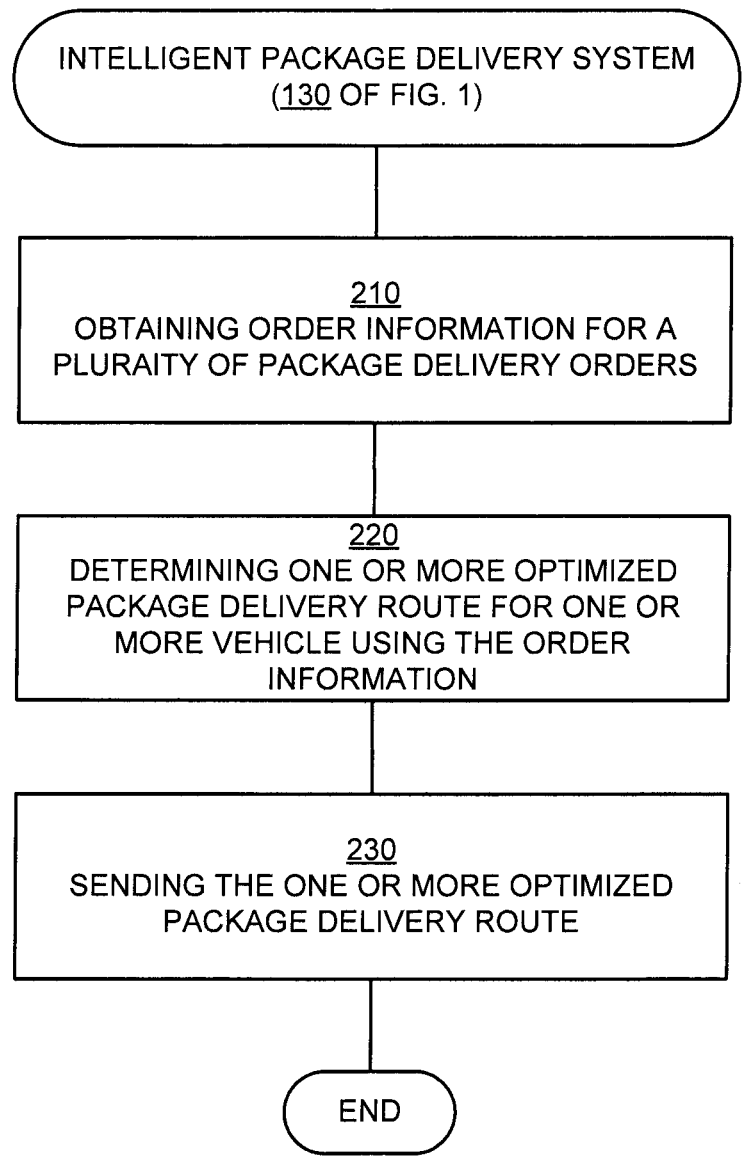
FIG. 2 depicts a top-level flowchart for the intelligent package delivery system according to an embodiment.

FIG. 2 depicts a top-level flowchart illustrating a method that may be performed by the intelligent package delivery system 130 of FIG. 1, in accordance with one or more embodiments set forth herein.

Blocks 210 through 230 indicate a package delivery planning session for a user, as performed by the intelligent package delivery system 130 by use of various functional components as described in FIG. 1.

At block 210, the intelligent package delivery system 130 can perform obtaining order information for a plurality of package delivery orders, wherein the order information includes one or more package pickup stop and one or more package drop off stop.

At block 220, the intelligent package delivery system 130 can perform determining one or more optimized package delivery route for one more vehicle using the order information, wherein an optimized package delivery route of the one or more optimized package delivery route includes a first stop associated to a first order of the plurality of package delivery orders and a second stop associated to a second order of the plurality of package delivery orders.

At block 220, the intelligent package delivery system 130 can transmit the one or more optimized package delivery route for the one or more vehicle.

Obtaining order information at block 210 can include obtaining order information from one or more user devices 120A-120B as input by one or more users 110A-110B. Alternatively or in addition to obtaining order information at block 210 can include obtaining order information from one or more order collection entity systems 150A-150B. In one embodiment an order obtained by system 130 can include information of a customer user having a user location, and a package provider e.g. retail store or warehouse having a package provider location. System 130 can obtain information of a first order from a first order collection entity system 150A maintained e.g. by a first retail store and can obtain information of a second order from a second order collection entity system 150B maintained e.g. by a retail store. Order information can include information of a package order, e.g. package pickup location, package drop off location, and package information e.g. size, weight, package dimensions, customer names, customer delivery address location (which can be sorted to determine who is in the same building etc).

Figure 3:
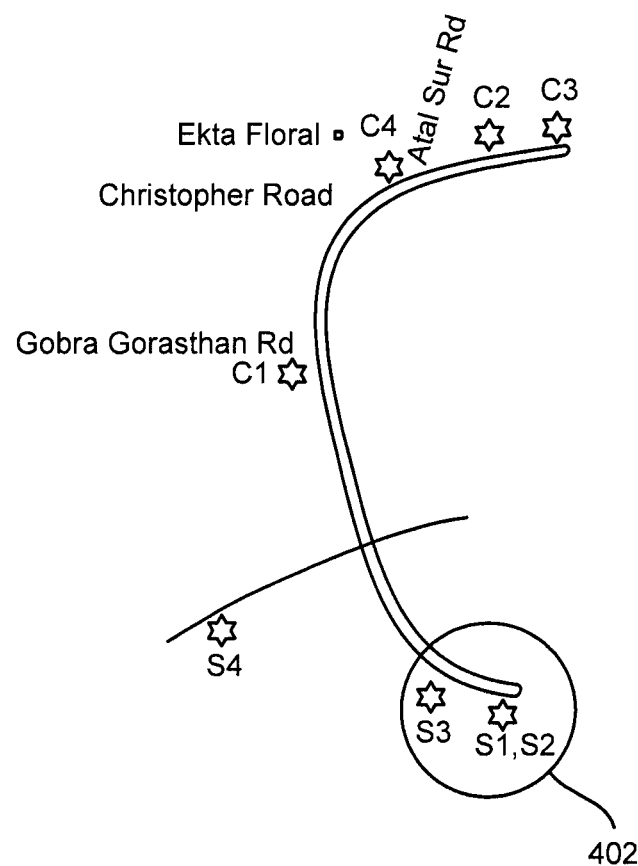
FIG. 3 depicts a delivery map for illustration of various features according to an embodiment herein.

In one aspect determining at block 220 can include establishing a geofence 402 as illustrated in FIG. 3 and using the geofence 402 to identify clusters of delivery stops. Delivery stops can include package pickup stops (e.g. a retailer's location such as a retail store or warehouse) and package drop off stops (locations where a package is delivered, e.g. residences of customer users). FIG. 3 illustrates a plurality of delivery stops mapped over a geographical area. Stops C1-C4 are package delivery stops (e.g. customer locations) and stops S1-S4 are package pickup stops (e.g. store location). In one embodiment, stops C1, S1 can be stops of a first package delivery order by a first user, stops C2, S2 can be stops of a second package delivery order by a second user, stops C3, S3 can be stops of a third package delivery order by a third user, and stops C4, S4 can be stops of a fourth package delivery order by a fourth user. In one embodiment as illustrated in FIG. 3 there can be one package pickup stop and one package drop off stop associated with each package delivery order. In one embodiment as illustrated in FIG. 3 there is indicated one package pickup stop and one package drop off stop associated per order for purposes of simplified explanation but other package delivery orders are envisioned.

With further reference to FIG. 3, geofence 402 can be established to identify clusters of stops. Geofence 402 in one embodiment can define a spatial area and can be e.g. circular, square, oval or any other shape. If two or more stops fit within an area of a geofence 402 system 130 can determine that the stops form a cluster of stops, and can include such determined clusters of stops in candidate package delivery routes. Using geofence 402 as shown in FIG. 3 which may be moved to various locations on the map of the FIG. 3 stops S1, S2, and S3 may be determined to form a cluster of stops and stops C2 and C3 (which can fit within the area of geofence 402) may be determined to form a cluster of stops.

For determining an optimized route at block 220, system 130 can include in the optimized route clusters of stops as identified using geofence 402.

Figure 4:
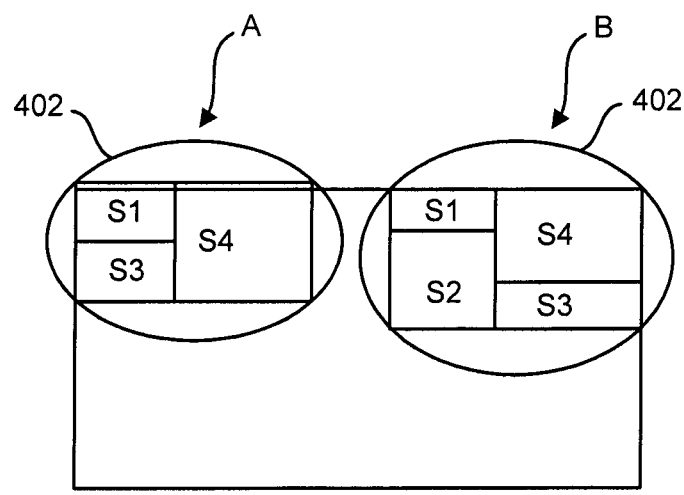
FIG. 4 depicts a delivery map for illustration of various features according to an embodiment herein.

In one embodiment, intelligent package delivery system 130 can establish geofence 402 as a dynamically established geofence having a dynamically variable size. In one embodiment, system 130 can dynamically vary a size of geofence 402 based on a population density of an area in which geofence 402 is located. In FIG. 4 there is illustrated geofence 402 located at a first location A of higher population density and geofence 402 located at a second location B of lower population density. In areas of lower population density system 130 can establish geofence 402 to be of larger size so that additional stops can be encompassed within a geofence for identifying a cluster of stops. A geofence radius can be set on a granular level based on factors such as geolocation. For example, in New York City, the radius for pulling in other store purchases might be smaller because there is simply so many deliveries going on that it would bog down the system to combine delivery stops. However, in the rural areas, a gefoence radius might be set a larger to account for the spacing and ease of vehicle movement. The configured geofence radii can relate to how close stores are together on one side, and will relate to how close customers are together on another side. So in Cedar Park, Tex., the concept of "close enough neighbors" might be anyone in a single story house on the same or adjacent street. In New York City, "close enough neighbors" might be those in the same building only.

In one aspect determining at block 220 can include establishing a time window and using the time window to identify clusters of delivery stops. Referring again to FIG. 3 stops C1, S1 can be stops of a first package delivery order by a first user, stops C2, S2 can be stops of a second package delivery order by a second user, stops C3, S3 can be stops of a third package delivery order by a third user, and stops C4, S4 can be stops of a fourth package delivery order by a fourth user. Each of the delivery stops C1-C4, S1-S4 can have a targeted delivery time. With further reference to FIG. 3 system 130 can establish a time window to identify clusters of stops. If two or more stops have target times within an established time window, then system 130 can determine that the stops form a cluster of stops, and can include such determined clusters of stops in candidate package delivery routes. In one embodiment, system 310 can dynamically establish a time window based on one or more of e.g. a calendar date (larger time windows can be used on weekends, shorter time windows in days approaching December 25), or weather (larger time windows may be used during periods of inclement weather).

In one embodiment as illustrated in FIG. 3 there is indicated one package pickup stop and one package drop off stop associated per order for purposes of simplified explanation but other package delivery orders are envisioned.

In one embodiment, system 130 can be operative so that a geofence and/or a time window are user configurable, e.g. through use by an administrator of a user interface of system 130. An administrator user can elect to change a size of a geofence and/or a time window to increase or decrease an amount of delivery stop clustering in a determined delivery route.

As set forth herein intelligent package delivery system 130 in one embodiment can obtain information of a first order of a first customer user from a first order collection entity system 150A maintained e.g. by a first retail store and can obtain information of a second order of a second customer user from a second order collection entity system 150B maintained e.g. by a retail store. In one embodiment determining one or more optimized delivery route at block 220 can include determining a delivery route having a first stop of the first order and a second stop of the second order. In one embodiment the first order can include the first stop provided by a first retail store and the second order can include the second stop provided by a second retail store. In one embodiment the first order can include the first stop provided by a residence of the first user and the second order can include the second stop provided by a residence of the second user.

In one embodiment the sending of one or more optimized package delivery route at block 230 can include sending to one or more vehicle system 140A-140B. The one or more vehicle system 140A-140B can include e.g. systems of autonomous vehicles and/or non-autonomous vehicles. Where a system is a system of an autonomous vehicle system, the system can be configured to automatically execute the determined optimized package delivery route on receipt thereof.

In one embodiment one or more of the sending at block 230 the determining at block 220 and the obtaining at block 210 can be performed during the performance of a current package delivery route. In one embodiment, the determined one or more optimized delivery route determined at block 220 and sent at block 230 can be an updated optimized package delivery route updated during performance of a current package delivery route of one or more vehicle having the one or more vehicle system 140A-140B.

In one embodiment intelligent package delivery system 130 can perform determining a predicted package delivery order for a certain user, and sending the predicted package delivery order to the certain user for confirmation.

For determining a predicted package delivery order for a certain user, system 130 can use history repository 133. History repository 133 can store information on past orders of and/or past delivery to users of intelligent package delivery system 130. System 130 can examine history repository 133 to determine order trends (e.g. a certain user always ordering from a certain store each Tuesday for delivery on Wednesday). Based on such determined trends system 130 can determine a predicted package delivery order for a certain user. In such embodiment where system 130 can determine predicted package delivery orders, the plurality of package delivery orders referred to at block 210 can include one or more confirmed package delivery order that has been confirmed by a certain user in response to the sending of the predicted package delivery order to the certain user for confirmation. In one embodiment, system 130 can be configured to continuously update history repository 133.

In one embodiment, intelligent package delivery system 130 can include features for proactive marketing which can facilitate deliveries to multiple close-by customers at the same time frame and on the same delivery truck, and do so based on known trends of buyers. More specifically system 130 as set forth herein can determine predicted package delivery orders of a certain customer users. In another aspect system 130 and can send one or more message including a predicted package delivery order to the certain users for confirmation. With system 130 sending the one or more message including a predicted order for confirmation, system 130 can send an incentive promotional offer for acceptance which can increase a likelihood of the predicted package delivery order being confirmed. In such embodiment, system 130 can be configured so that a received acceptance of a promotional offer received by system 130 from a certain user provides confirmation of the predicted package delivery order by the certain user. History repository 133 can include information on what people are buying and when they are buying it. Some people habitually buy at certain times. In combining that knowledge with knowledge of what their neighbors sometimes like to buy on line, a focused marketing effort can be made in such a way as to tempt said user to "buy within the next 4 hours for delivery on Monday June 12th, and receive half off of the shipping costs." As additional incentive, various retail outlets may e.g. offer 10 percent off the product under the circumstances offered by the shipping company.

Intelligent package delivery system 130 can provide various advantages and efficiencies. For example, a customer who previously received package delivery from only one entity such as one retail store can receive package deliveries from multiple entities such as multiple retail stores.

There is set forth herein, for example, (1) A method comprising:

obtaining, by one or more processor, order information for a plurality of package delivery orders, wherein the order information includes one or more package pickup stop and one or more package drop off stop; and determining, by the one or more processor, one or more optimized package delivery route for one more vehicle using the order information, wherein an optimized package delivery route of the one or more optimized package delivery route includes a first stop associated to a first order of the plurality of package delivery orders and a second stop associated to a second order of the plurality of package delivery orders. There is also set forth herein (2) the method of (1), wherein the method includes sending the optimized package delivery route to a vehicle system. There is also set forth herein (3) the method of (1), wherein the method includes sending the optimized package delivery route to a vehicle system of an autonomous vehicle for automatic execution by the vehicle system on receipt of the optimized package delivery route. There is also set forth herein (4) the method of (1), wherein the plurality of package delivery orders includes a first order of a first user and a second order of a second user. There is also set forth herein (5) the method of (1), wherein each of first and second orders of the plurality of orders includes information of a user having a user location and information of a package provider having a package provider location. There is also set forth herein (6) the method of (1), wherein the plurality of package deliver orders includes a first order of a first user obtained from a first entity that collects package deliver orders and a second order of a second user obtained from a second entity that collects package delivery orders. There is also set forth herein (7) the method of (1), wherein the determining includes performing the determining using a geofence so that the optimized package delivery mute includes a first package pickup stop associated with a first order, and a second package pickup stop associated to a second order, wherein the first stop is provided by the first package pickup stop, and wherein the second stop is provided by the second package pickup stop. There is also set forth herein (8) the method of (1), wherein the determining includes performing the determining using a geofence so that the optimized package delivery route includes a first package drop off stop associated with a first order, and a second package drop off stop associated to a second order, wherein the first stop is provided by the first package drop off stop, and wherein the second stop is provided by the second package drop off stop. There is also set forth herein (9) the method of (1), wherein the determining includes performing the determining using a dynamically established geofence, wherein the dynamically established geofence is dynamically established based on a population density in an area in which the dynamically established geofence is established. There is also set forth herein (10) the method of (1), wherein the determining includes performing the determining using a dynamically established time window, wherein the dynamically established time window is dynamically established based on one or more of the following selected from the group consisting of calendar date and weather. There is also set forth herein (11) the method of (1), wherein the method includes using data of a history repository to determine a predicted package delivery order of a certain user. There is also set forth herein (12) the method of (1), wherein the method includes using data of a history repository to determine a predicted package delivery order of a certain user, sending to the certain user the predicted package delivery order for confirmation and sending to the certain user a promotional offer for acceptance. There is also set forth herein (13) the method of (1), wherein the method includes determining a predicted package delivery order for a certain user, and sending the predicted package delivery order to the certain user for confirmation, wherein the plurality of package delivery orders includes a confirmed package delivery order that has been confirmed by a certain user in response to the sending the predicted package delivery order to the certain user for confirmation. There is also set forth herein (14) the method of (1), wherein the method includes using data of a history repository to determine a predicted package delivery order of a certain user, and sending to the certain user the predicted package delivery order for confirmation and a promotional offer for acceptance, wherein the plurality of package delivery orders includes a confirmed package delivery order that has been confirmed by a certain user in response to the sending the predicted package delivery order to the certain user for confirmation, wherein the determining includes performing the determining using a dynamically established geofence, wherein the dynamically established geofence is dynamically established based on a population density in an area in which the dynamically established geofence is established, wherein the determining includes performing the determining using a dynamically established time window, wherein the dynamically established time window is dynamically established based on one or more of the following selected from the group consisting of calendar date and weather, and wherein the method includes sending the optimized package delivery route to a vehicle system of an autonomous vehicle for automatic execution by the vehicle system on receipt of the optimized package delivery route. There is set forth herein, for example, (15) A computer program product comprising: a computer readable storage medium readable by one or more processing unit and storing instructions for execution by one or more processor for performing a method for automated package delivery planning, comprising: obtaining order information for a plurality of package delivery orders, wherein the order information includes one or more package pickup stop and one or more package drop off stop; and determining one or more optimized package delivery route for one more vehicle using the order information, wherein an optimized package delivery route of the one or more optimized package delivery route includes a first stop associated to a first order of the plurality of package delivery orders and a second stop associated to a second order of the plurality of package delivery orders. There is also set forth herein (16) the computer program product of (15), wherein the determining includes performing the determining using a dynamically established geofence, wherein the dynamically established geofence is dynamically established based on a population density in an area in which the dynamically established geofence is established. There is also set forth herein (17) the computer program product of (15), wherein the determining includes performing the determining using a dynamically established time window. There is also set forth herein (18) the computer program product of (15), wherein the method includes using data of a history repository to determine a predicted package delivery order of a certain user, sending to the certain user the predicted package delivery order for confirmation and sending to the certain user a promotional offer for acceptance. There is also set forth herein (19) the computer program product of (15), wherein the method includes determining a predicted package delivery order for a certain user, and sending the predicted package delivery order to the certain user for confirmation, wherein the plurality of package delivery orders includes a confirmed package delivery order that has been confirmed by a certain user in response to the sending the predicted package delivery order to the certain user for confirmation. There is set forth herein, for example, (20) A system comprising a memory; at least one processor in communication with memory; and program instructions executable by one or more processor via the memory to perform a method for automated package delivery planning, comprising: obtaining order information for a plurality of package delivery orders, wherein the order information includes one or more package pickup stop and one or more package drop off stop; and determining one or more optimized package delivery route for one more vehicle using the order information, wherein an optimized package delivery route of the one or more optimized package delivery mute includes a first stop associated to a first order of the plurality of package delivery orders and a second stop associated to a second order of the plurality of package delivery orders.

Certain embodiments herein may offer various technical computing advantages, including fully automating, customizing and following up a package delivery planning process that can coordinate activities between different users and entities. By way of particular arrangements of features e.g. including one or more of a network infrastructure feature, a geofence feature, a time window feature, a scoring process feature, a predictive process feature, or history repository feature, resources such as delivery resources otherwise underutilized can be subject to use optimization. Time resources can be optimized as well as infrastructure and fuel resources for example. Automating personalized package delivery planning can be critical as package delivery options to choose from have increased significantly according to the latest rapid evolution of telecommunication and e-commerce technologies, and consequently finding a best possible package delivery options by manually investigating all applicable package delivery options becomes unachievable. Due to the vast number of package delivery options available, package delivery entities often miss out the most preferable options simply because such package delivery options had not been informed to the package delivery entities at the time of planning. Certain embodiments herein can perform automatic searches based on various factors that would ensure informed decision can be made by users, makes recommendations to the users and assists package delivery entities in optimizing their resources.

Figure 6:
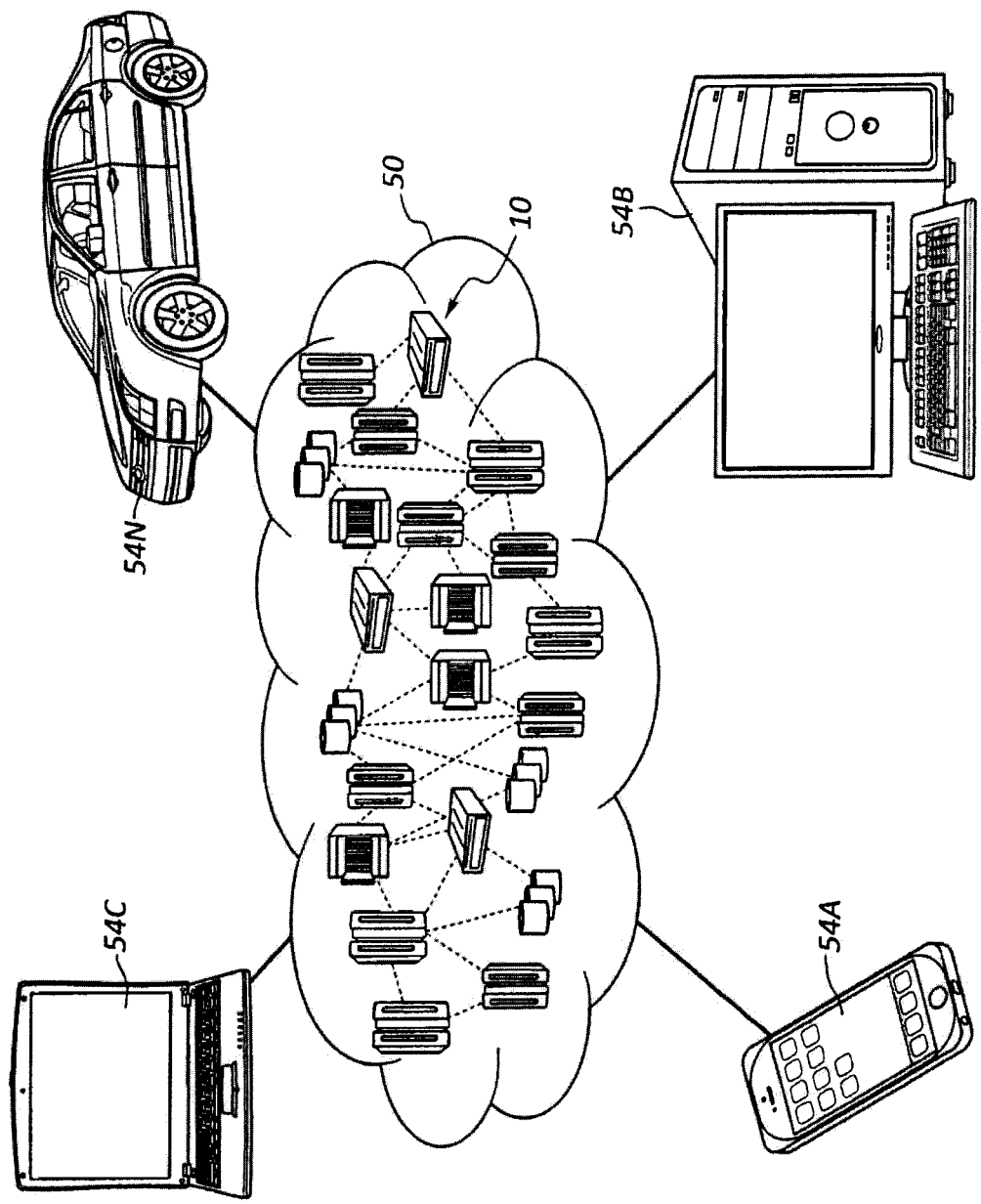
FIG. 6 depicts a cloud computing environment according to an embodiment.
Figure 7:
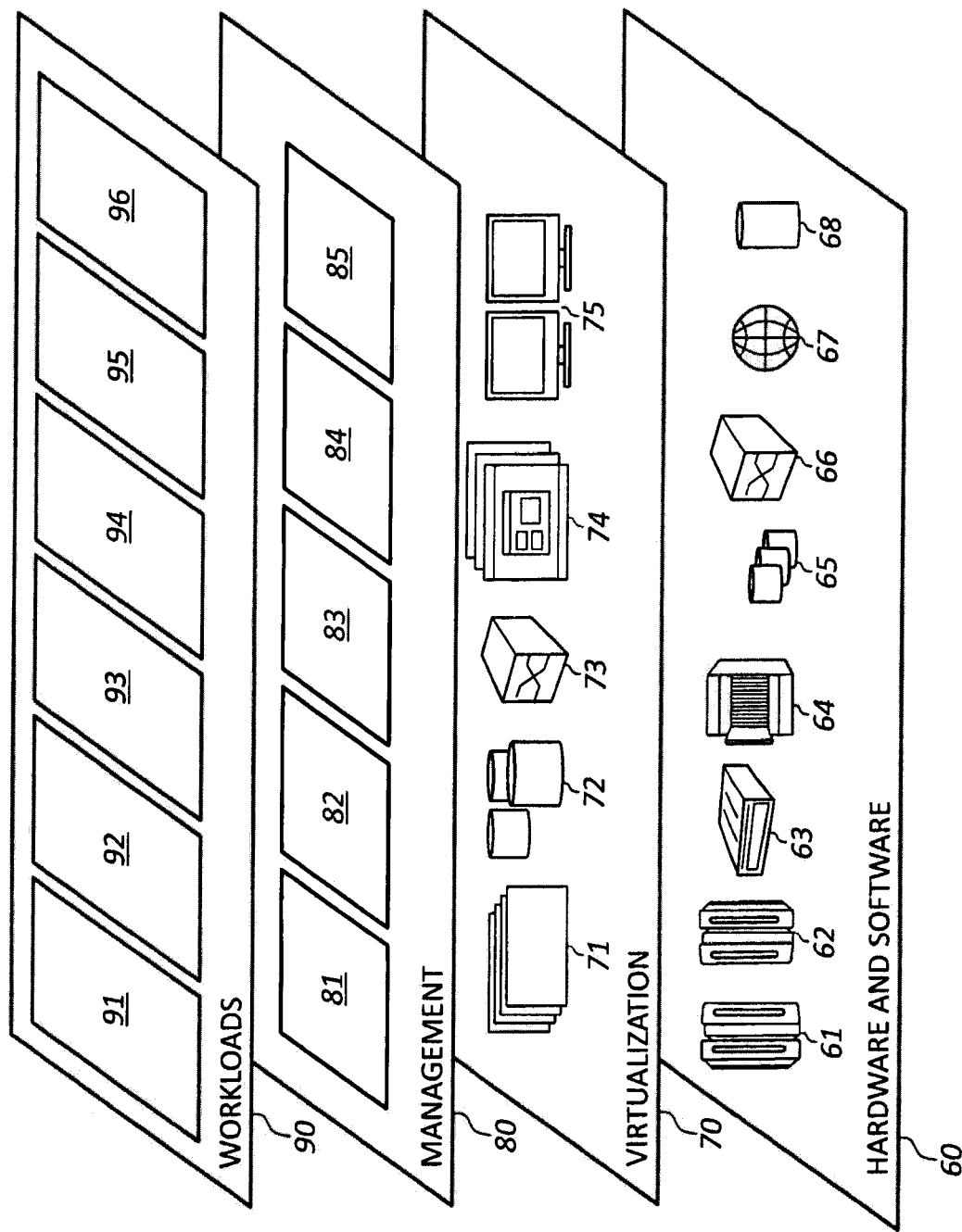
FIG. 7 depicts abstraction model layers according to an embodiment.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computer system computing node is shown. In one embodiment, computing node 10 is suitable for use as a cloud computing node. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove.

In computing node 10 there can be a computer system 12, which can be operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in computing node 10 is shown in the form of a general-purpose computing device. The components of computer system 12 may include, but are not limited to, one or more processors 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 6-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the web user interface 121 and the intelligent package delivery system 130 of FIG. 1. One or more program 40 including program processes 42, can generally carry out functions and/or methodologies of embodiments of described herein including functions attributable to system 130, e.g. including functions set forth herein in connection with intelligent package delivery system 130, e.g. functions associated with history repository 133, scoring process 139, and external source coordinator 141 (FIG. 1), and including functions as set forth herein in connection with the flowchart of FIG. 2

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor or an audio input device. In FIG. 6 herein, computing node 10 is implemented in a cloud computing environment and thus in the context of FIG. 6 is referred to as a cloud computing node.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for an intelligent package delivery planning system, as described herein. The processing components 96 can be implemented by one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A system comprising:
a memory;
at least one processor in communication with the memory; and
program instructions executable by one or more processor via the memory to perform a method for automated package delivery planning, comprising:
obtaining order information for a plurality of package delivery orders, wherein the order information includes one or more package pickup stop and one or more package drop off stop, wherein the obtaining order information for a plurality of package delivery orders includes obtaining a first set of package delivery orders from a first enterprise entity that collects package delivery orders, and a second set of package delivery orders from a second enterprise entity that collects package delivery orders; and
determining an optimized package delivery route for an autonomous vehicle using the order information, wherein the optimized package delivery route includes a first stop associated to a first order of the plurality of package delivery orders and a second stop associated to a second order of the plurality of package delivery orders, wherein the first order associated to the first stop is an order obtained from the first enterprise entity that collects package delivery orders, and wherein the second order associated to the second stop is an order obtained from the second enterprise entity that collects package delivery orders,
wherein the obtaining order information for a plurality of package delivery orders includes obtaining the first set of package delivery orders from the first enterprise entity that collects package delivery orders, and the second set of package delivery orders from the second enterprise entity that collects package delivery orders so that the determining the optimized package delivery route for the autonomous vehicle using the order information includes processing the first set of package delivery orders and the second set of package delivery orders, wherein the determining the optimized package delivery route includes generating a limited set of candidate routes and selecting the optimized package delivery route from the limited set of candidate routes based on an evaluating of the limited set of candidate routes so that the selected optimized package delivery route is selected from the limited set of candidate routes and wherein generating the limited set of candidate routes has included processing the order information for the plurality of package delivery orders to identify a cluster of stops that comprises the first stop associated to the first order and the second stop associated to the second order, wherein identifying the cluster of stops that comprises the first stop associated to the first order and the second stop associated to the second order has included using geofence processing, and time window processing, wherein according to the geofence processing the first stop associated to the first order and the second stop associated to the second order have been determined to define a common cluster of stops by being included within a common geofence, and wherein according to the time window processing the first stop according to the first order and the second stop associated to the second order are determined to be included in a common cluster of stops by having delivery times within a common time window, wherein the method includes iteratively performing the obtaining, the determining, and a sending during performance of a current package delivery route so that during performance of the current package delivery route an updated version of the optimized package delivery route is iteratively determined by the determining and iteratively sent by the sending, and wherein during performance of the current package delivery route the autonomous vehicle changes its operation to execute the optimized package delivery route which the autonomous vehicle iteratively receives and executes during performance of the current package delivery, and which optimized package delivery route is iteratively updated, wherein the generating a limited set of candidate routes includes iteratively generating the limited set of candidate routes on the basis of a candidate route comprising a candidate stop that is (a) within a geofence determined by the geofence processing wherein (b) a delivery time associated to the candidate stop is within an iteratively determined time window determined by the time window processing, wherein the iteratively performing the determining includes applying a scoring function, wherein the applying the scoring function includes accessing trip time data from a first external data source that stores trip time data, accessing fuel price data from a second external source that stores fuel price data, and scoring respective ones of the iteratively generated limited set of the candidate routes using a combination of data accessed from the first external data source and data accessed from the second external data source, wherein the system includes a user interface that permits an administrator to reconfigure the size of the common geofence, and a time period defining the common window, wherein the method includes receiving through the user interface a first administrator input to reduce the size of the common geofence so that a number of stops determined to define the common cluster of stops by being included within the common geofence is reduced based on the first administrator input and further so that a number of routes defining the limited set of candidate routes is reduced based on the first administrator input wherein the method includes receiving through the user interface a second administrator input to reduce the time period of the common time window so that a number of stops determined to define the common cluster of stops by being included within the common time window is reduced based on the second administrator input and further so that a number of routes defining the limited set of candidate routes is reduced based on the second administrator input.

2. The system of claim 1, wherein the method includes iteratively sensing current weather conditions and iteratively adjusting the performing of the determining based on the time window processing so that performance of the determining based on the time window processing is dependent on sensed changes in the iteratively sensed current weather conditions, and wherein during performance of the current package delivery route the autonomous vehicle changes its operation to execute the optimized package delivery route which the autonomous vehicle iteratively receives and executes during performance of the current package delivery, and which optimized package delivery route is iteratively updated by the determining, wherein the method includes first registering the first enterprise entity that collects package delivery orders as a first registered user of a computing node based system that performs the obtaining and the determining, wherein the method includes second registering the second enterprise entity that collects package delivery orders as a second registered user of the computing node based system that performs the obtaining and the determining, establishing a first data sharing agreement based on the first registering between the computing node based system that performs the obtaining and the determining, and the first enterprise entity that collects package delivery orders, and establishing a second data sharing agreement based on the second registering between the computing node based system that performs the obtaining and the determining, and the second enterprise entity that collects package delivery orders, wherein the iteratively performing the obtaining includes iteratively obtaining order information of orders resulting from a promotion process, wherein the promotion process includes (a) examining data of a history repository having package order history data of a plurality of users; (b) predicting based on the examining that a first user will present a first user order for a first item, the first user order for the first item having a certain stop at a certain location and a certain associated delivery time; (c) predicting based on the examining that a second user will present a second user order for a second item, the second order for the second item having a particular stop at a particular location and a particular associated delivery time; and (d) promoting delivery of the first item to the first user and the second item to the second user by a common truck, wherein the promoting includes (i) transmitting, in response to the predicting of (a), a first notification to the first user configured to increase the likelihood of that the first user will present the first order, (ii) transmitting, in response to the predicting of (b), a second notification to the second user configured to increase the likelihood that the second user will present the second order, wherein the method includes
  receiving from the first user a first confirmation in response to the first notification so that the first user order by the first user is presented by the first user;
  receiving from the second user a second confirmation so that the second user order by the second user is presented by the second user;
    in response to the receiving from the first user the first confirmation and the receiving from the second user the second confirmation including the first user order and the second user order in the order information so that the obtaining order information for a plurality of package delivery orders includes obtaining the first user order and the second user order, wherein the method includes, according to the geofence processing, examining the certain stop and the particular stop to ascertain that the certain stop and the particular stop fit within the common geofence, and according to the time window processing, examining the certain delivery time and the particular delivery time to ascertain that the certain delivery time and the particular delivery time fall within a common time window;
    wherein the method includes, in response to the ascertaining that the certain stop and the particular stop fit within the common geofence, and the ascertaining that the certain delivery time and the particular delivery time fall within a common time window, including a promoted candidate route having the certain stop and the particular stop in the limited set of candidate routes; and
  selecting the promoted candidate route having the certain stop and the particular stop as the optimized route based on scoring of the promoted candidate route.

3. The system of claim 1, wherein the method includes iteratively sensing current weather conditions and iteratively adjusting the performing of the determining based on the time window processing so that performance of the determining based on the time window processing is dependent on sensed changes in the iteratively sensed current weather conditions.

4. The system of claim 1, wherein during performance of the current package delivery route the autonomous vehicle changes its operation to execute the optimized package delivery route which the autonomous vehicle iteratively receives and executes during performance of the current package delivery, and which optimized package delivery route is iteratively updated by the determining.

5. The system of claim 1, wherein the method includes first registering the first enterprise entity that collects package delivery orders as a first registered user of a computing node based system that performs the obtaining and the determining, wherein the method includes second registering the second enterprise entity that collects package delivery orders as a second registered user of the computing node based system that performs the obtaining and the determining.

6. The system of claim 1, wherein the method includes first registering the first enterprise entity that collects package delivery orders as a first registered user of a computing node based system that performs the obtaining and the determining, wherein the method includes second registering the second enterprise entity that collects package delivery orders as a second registered user of the computing node based system that performs the obtaining and the determining, establishing a first data sharing agreement based on the first registering between the computing node based system that performs the obtaining and the determining, and the first enterprise entity that collects package delivery orders, and establishing a second data sharing agreement based on the second registering between the computing node based system that performs the obtaining and the determining, and the second enterprise entity that collects package delivery orders.

7. The system of claim 1, wherein the iteratively performing the obtaining includes iteratively obtaining order information of orders resulting from a promotion process, wherein the promotion process includes (a) examining data of a history repository having package order history data of a plurality of users; (b) predicting based on the examining that a first user will present a first user order for a first item, the first user order for the first item having a certain stop at a certain location and a certain associated delivery time; (c) predicting based on the examining that a second user will present a second user order for a second item, the second order for the second item having a particular stop at a particular location and a particular associated delivery time; and (d) promoting delivery of the first item to the first user and the second item to the second user by a common truck, wherein the promoting includes (i) transmitting, in response to the predicting of (a), a first notification to the first user configured to increase the likelihood of that the first user will present the first order, (ii) transmitting, in response to the predicting of (b), a second notification to the second user configured to increase the likelihood that the second user will present the second order.

8. A computer implemented method comprising:
  obtaining order information for a plurality of package delivery orders, wherein the order information includes one or more package pickup stop and one or more package drop off stop, wherein the obtaining order information for a plurality of package delivery orders includes obtaining a first set of package delivery orders from a first enterprise entity that collects package delivery orders, and a second set of package delivery orders from a second enterprise entity that collects package delivery orders; and
  determining an optimized package delivery route for an autonomous vehicle using the order information, wherein the optimized package delivery route includes a first stop associated to a first order of the plurality of package delivery orders and a second stop associated to a second order of the plurality of package delivery orders, wherein the first order associated to the first stop is an order obtained from the first enterprise entity that collects package delivery orders, and wherein the second order associated to the second stop is an order obtained from the second enterprise entity that collects package delivery orders,
  wherein the obtaining order information for a plurality of package delivery orders includes obtaining the first set of package delivery orders from the first enterprise entity that collects package delivery orders, and the second set of package delivery orders from the second enterprise entity that collects package delivery orders so that the determining the optimized package delivery route for the autonomous vehicle using the order information includes processing the first set of package delivery orders and the second set of package delivery orders,
  wherein the determining the optimized package delivery route includes generating a limited set of candidate routes and selecting the optimized package delivery route from the limited set of candidate routes based on an evaluating of the limited set of candidate routes so that the selected optimized package delivery route is selected from the limited set of candidate routes and wherein generating the limited set of candidate routes has included processing the order information for the plurality of package delivery orders to identify a cluster of stops that comprises the first stop associated to the first order and the second stop associated to the second order, wherein identifying the cluster of stops that comprises the first stop associated to the first order and the second stop associated to the second order has included using geofence processing, and time window processing, wherein according to the geofence processing the first stop associated to the first order and the second stop associated to the second order have been determined to define a common cluster of stops by being included within a common geofence, and wherein according to the time window processing the first stop according to the first order and the second stop associated to the second order are determined to be included in a common cluster of stops by having delivery times within a common time window, wherein the method includes iteratively performing the obtaining, the determining, and a sending during performance of a current package delivery route so that during performance of the current package delivery route an updated version of the optimized package delivery route is iteratively determined by the determining and iteratively sent by the sending, and wherein during performance of the current package delivery route the autonomous vehicle changes its operation to execute the optimized package delivery route which the autonomous vehicle iteratively receives and executes during performance of the current package delivery, and which optimized package delivery route is iteratively updated, wherein the generating a limited set of candidate routes includes iteratively generating the limited set of candidate routes on the basis of a candidate route comprising a candidate stop that is (a) within a geofence determined by the geofence processing wherein (b) a delivery time associated to the candidate stop is within an iteratively determined time window determined by the time window processing, wherein the iteratively performing the determining includes applying a scoring function, wherein the applying the scoring function includes accessing trip time data from a first external data source that stores trip time data, accessing fuel price data from a second external source that stores fuel price data, and scoring respective ones of the iteratively generated limited set of the candidate routes using a combination of data accessed from the first external data source and data accessed from the second external data source, wherein the method includes providing a user interface that permits an administrator to reconfigure the size of the common geofence, and a time period defining the common window, wherein the method includes receiving through the user interface a first administrator input to reduce the size of the common geofence so that a number of stops determined to define the common cluster of stops by being included within the common geofence is reduced based on the first administrator input and further so that a number of routes defining the limited set of candidate routes is reduced based on the first administrator input, wherein the method includes receiving through the user interface a second administrator input to reduce the time period of the common time window so that a number of stops determined to define the common cluster of stops by being included within the common time window is reduced based on the second administrator input and further so that a number of routes defining the limited set of candidate routes is reduced based on the second administrator input.

9. The computer implemented method of claim 8, wherein the method includes iteratively sensing current weather conditions and iteratively adjusting the performing of the determining based on the time window processing so that performance of the determining based on the time window processing is dependent on sensed changes in the iteratively sensed current weather conditions, and wherein during performance of the current package delivery route the autonomous vehicle changes its operation to execute the optimized package delivery route which the autonomous vehicle iteratively receives and executes during performance of the current package delivery, and which optimized package delivery route is iteratively updated by the determining, wherein the method includes first registering the first enterprise entity that collects package delivery orders as a first registered user of a computing node based system that performs the obtaining and the determining, wherein the method includes second registering the second enterprise entity that collects package delivery orders as a second registered user of the computing node based system that performs the obtaining and the determining, establishing a first data sharing agreement based on the first registering between the computing node based system that performs the obtaining and the determining, and the first enterprise entity that collects package delivery orders, and establishing a second data sharing agreement based on the second registering between the computing node based system that performs the obtaining and the determining, and the second enterprise entity that collects package delivery orders, wherein the iteratively performing the obtaining includes iteratively obtaining order information of orders resulting from a promotion process, wherein the promotion process includes (a) examining data of a history repository having package order history data of a plurality of users; (b) predicting based on the examining that a first user will present a first user order for a first item, the first user order for the first item having a certain stop at a certain location and a certain associated delivery time; (c) predicting based on the examining that a second user will present a second user order for a second item, the second order for the second item having a particular stop at a particular location and a particular associated delivery time; and (d) promoting delivery of the first item to the first user and the second item to the second user by a common truck, wherein the promoting includes (i) transmitting, in response to the predicting of (a), a first notification to the first user configured to increase the likelihood of that the first user will present the first order, (ii) transmitting, in response to the predicting of (b), a second notification to the second user configured to increase the likelihood that the second user will present the second order, wherein the method includes receiving from the first user a first confirmation in response to the first notification so that the first user order by the first user is presented by the first user;

receiving from the second user a second confirmation so that the second user order by the second user is presented by the second user;
in response to the receiving from the first user the first confirmation and the receiving from the second user the second confirmation including the first user order and the second user order in the order information so that the obtaining order information for a plurality of package delivery orders includes obtaining the first user order and the second user order, wherein the method includes, according to the geofence processing, examining the certain stop and the particular stop to ascertain that the certain stop and the particular stop fit within the common geofence, and according to the time window processing, examining the certain delivery time and the particular delivery time to ascertain that the certain delivery time and the particular delivery time fall within a common time window;
wherein the method includes, in response to the ascertaining that the certain stop and the particular stop fit within the common geofence, and the ascertaining that the certain delivery time and the particular delivery time fall within a common time window, including a promoted candidate route having the certain stop and the particular stop in the limited set of candidate routes; and
selecting the promoted candidate route having the certain stop and the particular stop as the optimized route based on scoring of the promoted candidate route.

10. The computer implemented method of claim 8, wherein the method includes iteratively sensing current weather conditions and iteratively adjusting the performing of the determining based on the time window processing so that performance of the determining based on the time window processing is dependent on sensed changes in the iteratively sensed current weather conditions.

11. The computer implemented method of claim 8, wherein during performance of the current package delivery route the autonomous vehicle changes its operation to execute the optimized package delivery route which the autonomous vehicle iteratively receives and executes during performance of the current package delivery, and which optimized package delivery route is iteratively updated by the determining.

12. The computer implemented method of claim 8, wherein the method includes first registering the first enterprise entity that collects package delivery orders as a first registered user of a computing node based system that performs the obtaining and the determining, wherein the method includes second registering the second enterprise entity that collects package delivery orders as a second registered user of the computing node based system that performs the obtaining and the determining.

13. The computer implemented method of claim 8, wherein the method includes first registering the first enterprise entity that collects package delivery orders as a first registered user of a computing node based system that performs the obtaining and the determining, wherein the method includes second registering the second enterprise entity that collects package delivery orders as a second registered user of the computing node based system that performs the obtaining and the determining, establishing a first data sharing agreement based on the first registering between the computing node based system that performs the obtaining and the determining, and the first enterprise entity that collects package delivery orders, and establishing a second data sharing agreement based on the second registering between the computing node based system that performs the obtaining and the determining, and the second enterprise entity that collects package delivery orders.

14. The computer implemented method of claim 8, wherein the iteratively performing the obtaining includes iteratively obtaining order information of orders resulting from a promotion process, wherein the promotion process includes (a) examining data of a history repository having package order history data of a plurality of users; (b) predicting based on the examining that a first user will present a first user order for a first item, the first user order for the first item having a certain stop at a certain location and a certain associated delivery time; (c) predicting based on the examining that a second user will present a second user order for a second item, the second order for the second item having a particular stop at a particular location and a particular associated delivery time; and (d) promoting delivery of the first item to the first user and the second item to the second user by a common truck, wherein the promoting includes (i) transmitting, in response to the predicting of (a), a first notification to the first user configured to increase the likelihood of that the first user will present the first order, (ii) transmitting, in response to the predicting of (b), a second notification to the second user configured to increase the likelihood that the second user will present the second order.

15. A computer program product comprising:
a computer readable storage medium readable by one or more processing circuit and storing instructions for execution by one or more processor for performing a method for automated package delivery planning, comprising:
obtaining order information for a plurality of package delivery orders, wherein the order information includes one or more package pickup stop and one or more package drop off stop, wherein the obtaining order information for a plurality of package delivery orders includes obtaining a first set of package delivery orders from a first enterprise entity that collects package delivery orders, and a second set of package delivery orders from a second enterprise entity that collects package delivery orders; and
determining an optimized package delivery route for an autonomous vehicle using the order information, wherein the optimized package delivery route includes a first stop associated to a first order of the plurality of package delivery orders and a second stop associated to a second order of the plurality of package delivery orders, wherein the first order associated to the first stop is an order obtained from the first enterprise entity that collects package delivery orders, and wherein the second order associated to the second stop is an order obtained from the second enterprise entity that collects package delivery orders,
wherein the obtaining order information for a plurality of package delivery orders includes obtaining the first set of package delivery orders from the first enterprise entity that collects package delivery orders, and the second set of package delivery orders from the second enterprise entity that collects package delivery orders so that the determining the optimized package delivery route for the autonomous vehicle using the order information includes processing the first set of package delivery orders and the second set of package delivery orders, wherein the determining the optimized package delivery route includes generating a limited set of candidate routes and selecting the optimized package delivery route from the limited set of candidate routes based on an evaluating of the limited set of candidate routes so that the selected optimized package delivery route is selected from the limited set of candidate routes and wherein generating the limited set of candidate routes has included processing the order information for the plurality of package delivery orders to identify a cluster of stops that comprises the first stop associated to the first order and the second stop associated to the second order, wherein identifying the cluster of stops that comprises the first stop associated to the first order and the second stop associated to the second order has included using geofence processing, and time window processing, wherein according to the geofence processing the first stop associated to the first order and the second stop associated to the second order have been determined to define a common cluster of stops by being included within a common geofence, and wherein according to the time window processing the first stop according to the first order and the second stop associated to the second order are determined to be included in a common cluster of stops by having delivery times within a common time window, wherein the method includes iteratively performing the obtaining, the determining, and a sending during performance of a current package delivery route so that during performance of the current package delivery route an updated version of the optimized package delivery route is iteratively determined by the determining and iteratively sent by the sending, and wherein during performance of the current package delivery route the autonomous vehicle changes its operation to execute the optimized package delivery route which the autonomous vehicle iteratively receives and executes during performance of the current package delivery, and which optimized package delivery route is iteratively updated, wherein the generating a limited set of candidate routes includes iteratively generating the limited set of candidate routes on the basis of a candidate route comprising a candidate stop that is (a) within a geofence determined by the geofence processing wherein (b) a delivery time associated to the candidate stop is within an iteratively determined time window determined by the time window processing, wherein the iteratively performing the determining includes applying a scoring function, wherein the applying the scoring function includes accessing trip time data from a first external data source that stores trip time data, accessing fuel price data from a second external source that stores fuel price data, and scoring respective ones of the iteratively generated limited set of the candidate routes using a combination of data accessed from the first external data source and data accessed from the second external data source, wherein the method includes providing a user interface that permits an administrator to reconfigure the size of the common geofence, and a time period defining the common window, wherein the method includes receiving through the user interface a first administrator input to reduce the size of the common geofence so that a number of stops determined to define the common cluster of stops by being included within the common geofence is reduced based on the first administrator input and further so that a number of routes defining the limited set of candidate routes is reduced based on the first administrator input, wherein the method includes receiving through the user interface a second administrator input to reduce the time period of the common time window so that a number of stops determined to define the common cluster of stops by being included within the common time window is reduced based on the second administrator input and further so that a number of routes defining the limited set of candidate routes is reduced based on the second administrator input.

16. The computer program product of claim 15, wherein the method includes iteratively sensing current weather conditions and iteratively adjusting the performing of the determining based on the time window processing so that performance of the determining based on the time window processing is dependent on sensed changes in the iteratively sensed current weather conditions, and wherein during performance of the current package delivery route the autonomous vehicle changes its operation to execute the optimized package delivery route which the autonomous vehicle iteratively receives and executes during performance of the current package delivery, and which optimized package delivery route is iteratively updated by the determining, wherein the method includes first registering the first enterprise entity that collects package delivery orders as a first registered user of a computing node based system that performs the obtaining and the determining, wherein the method includes second registering the second enterprise entity that collects package delivery orders as a second registered user of the computing node based system that performs the obtaining and the determining, establishing a first data sharing agreement based on the first registering between the computing node based system that performs the obtaining and the determining, and the first enterprise entity that collects package delivery orders, and establishing a second data sharing agreement based on the second registering between the computing node based system that performs the obtaining and the determining, and the second enterprise entity that collects package delivery orders, wherein the iteratively performing the obtaining includes iteratively obtaining order information of orders resulting from a promotion process, wherein the promotion process includes (a) examining data of a history repository having package order history data of a plurality of users; (b) predicting based on the examining that a first user will present a first user order for a first item, the first user order for the first item having a certain stop at a certain location and a certain associated delivery time; (c) predicting based on the examining that a second user will present a second user order for a second item, the second order for the second item having a particular stop at a particular location and a particular associated delivery time; and (d) promoting delivery of the first item to the first user and the second item to the second user by a common truck, wherein the promoting includes (i) transmitting, in response to the predicting of (a), a first notification to the first user configured to increase the likelihood of that the first user will present the first order, (ii)

transmitting, in response to the predicting of (b), a second notification to the second user configured to increase the likelihood that the second user will present the second order, wherein the method includes receiving from the first user a first confirmation in response to the first notification so that the first user order by the first user is presented by the first user;

receiving from the second user a second confirmation so that the second user order by the second user is presented by the second user;

in response to the receiving from the first user the first confirmation and the receiving from the second user the second confirmation including the first user order and the second user order in the order information so that the obtaining order information for a plurality of package delivery orders includes obtaining the first user order and the second user order, wherein the method includes, according to the geofence processing, examining the certain stop and the particular stop to ascertain that the certain stop and the particular stop fit within the common geofence, and according to the time window processing, examining the certain delivery time and the particular delivery time to ascertain that the certain delivery time and the particular delivery time fall within a common time window;

wherein the method includes, in response to the ascertaining that the certain stop and the particular stop fit within the common geofence, and the ascertaining that the certain delivery time and the particular delivery time fall within a common time window, including a promoted candidate route having the certain stop and the particular stop in the limited set of candidate routes; and selecting the promoted candidate route having the certain stop and the particular stop as the optimized route based on scoring of the promoted candidate route.

17. The computer program product of claim 15, wherein the method includes iteratively sensing current weather conditions and iteratively adjusting the performing of the determining based on the time window processing so that performance of the determining based on the time window processing is dependent on sensed changes in the iteratively sensed current weather conditions.

18. The computer program product of claim 15, wherein during performance of the current package delivery route the autonomous vehicle changes its operation to execute the optimized package delivery route which the autonomous vehicle iteratively receives and executes during performance of the current package delivery, and which optimized package delivery route is iteratively updated by the determining.

19. The computer program product of claim 15, wherein the method includes first registering the first enterprise entity that collects package delivery orders as a first registered user of a computing node based system that performs the obtaining and the determining, wherein the method includes second registering the second enterprise entity that collects package delivery orders as a second registered user of the computing node based system that performs the obtaining and the determining.

20. The computer program product of claim 15, wherein the iteratively performing the obtaining includes iteratively obtaining order information of orders resulting from a promotion process, wherein the promotion process includes (a) examining data of a history repository having package order history data of a plurality of users; (b) predicting based on the examining that a first user will present a first user order for a first item, the first user order for the first item having a certain stop at a certain location and a certain associated delivery time; (c) predicting based on the examining that a second user will present a second user order for a second item, the second order for the second item having a particular stop at a particular location and a particular associated delivery time; and (d) promoting delivery of the first item to the first user and the second item to the second user by a common truck, wherein the promoting includes (i) transmitting, in response to the predicting of (a), a first notification to the first user configured to increase the likelihood of that the first user will present the first order, (ii) transmitting, in response to the predicting of (b), a second notification to the second user configured to increase the likelihood that the second user will present the second order.

* * * * *